US011342786B2

(12) United States Patent
Paatero

(10) Patent No.: US 11,342,786 B2
(45) Date of Patent: May 24, 2022

(54) 3-WIRE MULTIPHASE UPS WITH BYPASS

(71) Applicant: ABB Schweiz AG, Baden (CH)

(72) Inventor: Esa-Kai Paatero, Helsinki (FI)

(73) Assignee: ABB SCHWEIZ AG, Baden (CH)

( * ) Notice: Subject to any disclaimer, the term of this patent is extended or adjusted under 35 U.S.C. 154(b) by 196 days.

(21) Appl. No.: 16/407,849

(22) Filed: May 9, 2019

(65) Prior Publication Data
US 2019/0267836 A1 Aug. 29, 2019

Related U.S. Application Data

(63) Continuation of application No. PCT/EP2017/078706, filed on Nov. 9, 2017.

(30) Foreign Application Priority Data

Nov. 9, 2016 (EP) .................................... 16197856

(51) Int. Cl.
*H02J 9/06* (2006.01)
*H02M 7/537* (2006.01)
*H02J 3/08* (2006.01)

(52) U.S. Cl.
CPC .............. *H02J 9/062* (2013.01); *H02J 9/061* (2013.01); *H02M 7/537* (2013.01); *H02J 3/08* (2013.01)

(58) Field of Classification Search
CPC ........... H02J 9/062; H02J 9/061; H02M 7/537
See application file for complete search history.

(56) References Cited

U.S. PATENT DOCUMENTS

| 6,295,215 B1 * | 9/2001 | Faria ....................... H02J 9/062 363/124 |
| 2003/0048006 A1 * | 3/2003 | Shelter, Jr. .............. H02J 9/062 307/64 |

(Continued)

FOREIGN PATENT DOCUMENTS

| AU | 638782 82 | 7/1993 | |
| AU | 682390 | * 7/1993 | .............. H02J 9/061 |

(Continued)

OTHER PUBLICATIONS

European Patent Office, International Search Report & Written Opinion issued in corresponding Application No. PCT/EP2017/078706, dated Feb. 9, 2018, 10 pp.

*Primary Examiner* — Rexford N Barnie
*Assistant Examiner* — Brian K Baxter
(74) *Attorney, Agent, or Firm* — Greenberg Traurig, LLP

(57) ABSTRACT

The present application includes an uninterruptable power supply device for connection of a 3-wire multiphase AC source to a 3-wire multiphase load, whereby the UPS device is provided for multiphase operation, including a converter part, which is connected to at least one power source and the load, and a 3-wire bypass, which interconnects the AC source to the load, whereby the bypass includes a bypass switch, which includes an independently controlled switching unit for each phase of the AC source, and the UPS device includes a control unit, which controls the converter part and the bypass switch, whereby the control unit controls the bypass switch to power one of the three phases of the load directly via the bypass by one phase of the AC source, and the control unit controls the converter part to power the remaining two phases of the load. The application further includes an uninterruptible power supply system including (Continued)

multiple of the above UPS devices, wherein the UPS devices are connected in parallel to the load.

20 Claims, 8 Drawing Sheets

(56) References Cited

U.S. PATENT DOCUMENTS

| | | | | |
|---|---|---|---|---|
| 2006/0133120 | A1* | 6/2006 | Sato | H02M 5/4585 |
| | | | | 363/37 |
| 2007/0114852 | A1* | 5/2007 | Lin | H02J 9/061 |
| | | | | 307/66 |
| 2010/0026220 | A1* | 2/2010 | Sakai | H02P 6/08 |
| | | | | 318/400.17 |
| 2011/0278931 | A1* | 11/2011 | Johnson, Jr. | H02J 9/062 |
| | | | | 307/66 |
| 2012/0113695 | A1* | 5/2012 | Chivite Zabalza | H02M 7/49 |
| | | | | 363/71 |
| 2012/0181871 | A1* | 7/2012 | Johansen | H02J 9/062 |
| | | | | 307/66 |
| 2012/0212982 | A1* | 8/2012 | Wei | H02M 5/4585 |
| | | | | 363/37 |
| 2015/0146327 | A1* | 5/2015 | Pfitzer | H03K 17/0828 |
| | | | | 361/18 |
| 2016/0344232 | A1* | 11/2016 | Paatero | H02J 9/06 |
| 2017/0085121 | A1* | 3/2017 | Cairoli | H02J 9/061 |

FOREIGN PATENT DOCUMENTS

| | | |
|---|---|---|
| EP | 1998431 A2 | 12/2008 |
| JP | 2006246616 A | 9/2006 |

* cited by examiner (state of the Art)

FIG. 2 (state of the Art)

US 11,342,786 B2

3-WIRE MULTIPHASE UPS WITH BYPASS

TECHNICAL FIELD

The present invention relates to the area of 3-wire multiphase uninterruptible power supply (UPS). In particular, the present invention relates an uninterruptible power supply (UPS) device for connection of a 3-wire multiphase AC source to a 3-wire multiphase load, whereby the UPS device is provided for multiphase operation, comprising a converter part, which is connected to at least one power source and the load, and a 3-wire bypass, which interconnects the AC source to the load, whereby the bypass comprises a bypass switch. The present invention also relates to an uninterruptible power supply (UPS) system comprising multiple UPS devices as specified above, wherein the UPS devices are connected in parallel to the load. The present invention further relates to an uninterruptible power supply (UPS) system for connection of a 3-wire multiphase AC source to a 3-wire multiphase load, whereby the UPS system is provided for multiphase operation, the UPS system comprising multiple converter parts, which are connected in parallel to at least one power source and the load, and a 3-wire bypass, which interconnects the AC source to the load. The present invention still further provides a method for controlling an uninterruptible power supply (UPS) device, which connects a 3-wire multiphase AC source to a 3-wire multiphase load, whereby the UPS device is provided for multiphase operation, comprising a converter part, which is connected to at least one power source and the load, and a 3-wire bypass, which interconnects the AC source to the load, and the method comprises controlling the converter part and the bypass switch.

BACKGROUND ART

Uninterruptible Power Supply (UPS) installations for larger powers can generally be distinguished based on two different, major types of installations. These refer 3-wire and 4-wire installation. The difference between these types of installations is presence or absence of a fourth conductor for Neutral (N). Both installation have in common the use of three phases (L). A 3-wire installation is common in North America, in particular the US-market, whereas a 4-wire installation is common in Europe. The rest of the world uses one or both of the above installation types.

These installation types obviously have different load configurations. IN the 3-wire installation, current flow is perforce L-L, i.e. the load is always connected between two phases. In a 4-wire installation, the load can be connected between two phases, i.e. L-L configuration, or between a phase and neutral, i.e. L-N configuration. For a large portion of 3-wire UPS installations, the UPS will be a 3-wire in and out UPS. There is typically a transformed provided on a load side, converting a typical 3-wire voltage of 480V to 208V/120V voltage for 4-wires, which is typically accepted by commonly used load equipment.

FIG. 1 shows a generic double conversion UPS device 10 according to a first embodiment, which is known in the Art. The UPS device 10 is connected between a 3-wire AC source 12 and a 3-wire load 14.

The UPS device 10 comprises a converter part 16 and a bypass 18, which are connected in parallel to the AC source 12 and the load 14. The converter part 16 is provided to perform double conversion and comprises an AC/DC converter 20, also referred to as rectifier, which is connected at its AC side to the AC source 12, and a DC/AC converter 22, also referred to as inverter, which is connected at its AC side to the load 14. A DC side of the AC/DC converter 20 and the DC/AC converter 22 is interconnected by a DC link 24, which isolates the AC source 12 from the load 14.

The converter part 16 further comprises a DC/DC converter 26, also referred to as battery converter, which connects a DC source 28 to the DC link 24. The DC source 28 is typically a stored energy source, in particular a battery. However, also different types of DC source including regenerative energy sources like photovoltaic sources or wind generators are possible.

The bypass 18 is provided with a bypass switch 30. The UPS device 10 also comprises a control unit 32, which is provided integrally with a user interface. The control unit 32 controls operation of the converter part 16 and the bypass switch 30.

FIG. 2 shows the double conversion UPS device 10 according to a second embodiment, which is essentially identical to the UPS device 10 of the first embodiment. Hence, only differences between the UPS devices of the first and second embodiment will be discussed in detail. Features not discussed with respect to the second embodiment are considered to be implemented as described with respect to the first embodiment.

The UPS module 10 of the second embodiment is shown as operated in case of a failure of the AC source 12. Hence, when operating in this state, some components are not required and therefore omitted for the sake of facilitating the drawing of FIG. 2. In particular, in case of failure of the AC source 12, the AC/DC converter 20 cannot operate and is therefore omitted. Consequently, functional parts of the converter part 16 in this operational state are the DC/AC converter 22 and the DC/DC converter 26, which are depicted in FIG. 2.

Furthermore, as indicated in FIG. 2, the bypass 30 contains an additional series impedance 34, which typically is an inductor. Also a separate charger 36 is provided for charging the DC source 28.

A major consideration for above UPS devices or systems is operational efficiency at system level. The industry standard double conversion UPS have an efficiency of the range of 96-97%. Efficiency increase are difficult to achieve based on improvements in presently available hardware. Such hardware based improvements typically require use of more expensive components. As a consequence, in environments where the quality of utility power is good, the UPS most frequently operates in either an 'eco'-mode or 'line interactive'-mode.

In eco-mode, the load is continuously connected directly to the AC source through a controlled bypass circuit, which bypasses a converter part of the UPS device. Load support relies on a fast response of the converter part and the bypass switch, which is provided in the bypass circuit, when a power quality event occurs. The power quality event is most frequently a complete failure of the AC source. Operation in eco-mode allows to achieve a UPS efficiency of even more than 99%.

In line interactive-mode, the load is also powered through the bypass. However, the converter part is operated to correct for minor bypass voltage deviations from load specification. In particular, at least the DC/AC converter of the converter part is operated to provide AC power from a DC link to the load. In addition, load or source harmonics may be actively compensated for a high power factor vs. source. A compensation current may pass only through the DC link ('capacitance') or also in part through a stored energy storage device, i.e. the battery.

The DC link can in general be powered by an AC source, a DC source, or others. Due to the operation of the converter part, an overall loss is added, thereby reducing an overall efficiency of the UPS. However, depending on the particular conditions of the AC source, there may still be an efficiency gain worth pursuing line interactive-mode.

During a complete source failure load is supported off the battery through the DC/AC converter. Battery charge may pass also in reverse through the DC/AC converter or the separate charger. In case the battery is charged via the DC link, the DC/DC converter scales voltage and/or current between the battery and the DC link.

In case the bypass is out of a load tolerance, both eco-mode as well as line-interactive mode revert to double conversion mode, where the load is powered from the AC source through the AC/DC-converter and the DC/AC-converter, or in case of a failure of the AC-source, the load is powered from the DC source via the DC/AC converter.

DISCLOSURE OF INVENTION

It is an object of the present invention to provide an uninterruptible power supply (UPS) device for connection of a 3-wire multiphase AC source to a 3-wire multiphase load, an uninterruptible power supply (UPS) system comprising multiple UPS devices, which are connected in parallel to the load, an uninterruptible power supply (UPS) system for connection of a 3-wire multiphase AC source to a 3-wire multiphase load and a method for controlling an uninterruptible power supply (UPS) device, which connects a 3-wire multiphase AC source to a 3-wire multiphase load, which enable an improved operation of the UPS device/system with high efficiency and reduced losses.

This object is achieved by the independent claims. Advantageous embodiments are given in the dependent claims.

In particular, the present invention provides an uninterruptible power supply (UPS) device for connection of a 3-wire multiphase AC source to a 3-wire multiphase load, whereby the UPS device is provided for multiphase operation, comprising an converter part, which is connected to at least one power source and the load, and a 3-wire bypass, which interconnects the AC source to the load, whereby the bypass comprises a bypass switch, which comprises an independently controlled switching unit for each phase of the AC source, and the UPS device comprises a control unit, which controls the converter part and the bypass switch, whereby the control unit controls the bypass switch to power one of the three phases of the load directly via the bypass by one phase of the AC source, and the control unit controls the converter part to power the remaining two phases of the load.

The present invention also provides an uninterruptible power supply (UPS) system comprising multiple UPS devices as specified above, wherein the UPS devices are connected in parallel to the load.

The present invention further provides an uninterruptible power supply (UPS) system for connection of a 3-wire multiphase AC source to a 3-wire multiphase load, whereby the UPS system is provided for multiphase operation, the UPS system comprising multiple converter parts, which are connected in parallel to at least one power source and the load, and a 3-wire bypass, which interconnects the AC source to the load, whereby the bypass comprises a bypass switch, which comprises an independently controlled switching unit for each phase of the AC source, and the UPS system comprises a control unit, which controls the multiple converter parts and the bypass switch, whereby the control unit controls the bypass switch to power one of the three phases of the load directly via the bypass by one phase of the AC source, and the control unit controls the multiple converter part to power the remaining two phases of the load.

The present invention still further provides a method for controlling an uninterruptible power supply (UPS) device, which connects a 3-wire multiphase AC source to a 3-wire multiphase load, whereby the UPS device is provided for multiphase operation, comprising a converter part, which is connected to at least one power source and the load, and a 3-wire bypass, which interconnects the AC source to the load, whereby the bypass comprises a bypass switch, which comprises an independently controlled switching unit for each phase of the AC source, and the method comprises controlling the converter part and the bypass switch, whereby the bypass switch is controlled to power one of the three phases of the load directly via the bypass by one phase of the AC source, and the converter part is controlled to power the remaining two phases of the load.

The basic idea of the invention is to implement a new mode of operation of the UPS device or the UPS system, which is defined by powering the load directly from one phase of the AC source via the bypass and powering the remaining two phases from the converter part, either from AC source, or from a DC source. This can be implemented with the capability to switch each phase in the bypass switch independently. Hence, the phase connected directly to the load enables power saving, since no converters are required and inherent converter losses are not applicable. At the same time, control of the remaining two phases enables full control of load voltage in the 3-wire installation. Hence, benefits from a mode, e.g. eco mode, where the load is powered directly and fully via the bypass, and a mode, e.g. line-interactive, where the converter part is operated to control all phases to correct for minor bypass voltage deviations from load specification, can be combined. Accordingly, the operation mode achieves reduces losses together with the capability to correct for minor bypass voltage deviations.

Hence, phase lock and link modulation can be combined. A benefit is a gain in efficiency over double conversion still maintaining the load isolation and voltage control capability of a converter in series from source to load. An implementation of the new operation mode can be achieved mostly based on existing hardware with is merely firmware changes. In addition, it may be required to provide the bypass switch with required switching technology to control the one phase of the load voltage.

The 3-wire multiphase AC source and 3-wire multiphase load refer to an AC source or a load, which do not have a neutral conductor, which would be a fourth wire installation. The absence of neutral enables simplified control of the load voltage, since voltage and current of two phases determine voltage and phase of the remaining phase.

As specified above, the UPS system with parallel UPS devices can be implemented in different ways. The UPS devices can be provided with individual bypasses and respective bypass switches, which are individually controlled by the UPS devices. Of course, the UPS system performs an additional overall control of the individual UPS devices, so that the UPS devices will essentially operate in parallel. Alternatively, the UPS system can have a central bypass and a central bypass switch. In that case, the individual UPS devices do not require an individual bypass.

The converter part can have different designs. The converter part is connected to at least one power source, Typically, the converter part is connected to an AC source, which may be the same AC source, which is connected to the bypass, or an individual AC source. Preferably, the converter part comprises or is connected to different sources, e.g. an AC source and a DC source. The DC source is typically an energy storage device, e.g. a battery.

The UPS module preferably has a user interface for configuration and maintenance purposes, e.g. a screen and a keyboard, a touchscreen, or others. Furthermore, the UPS device may comprise a communication interface for connection to other UPS modules, in particular to connect the control unit to control units of parallel UPS devices or a control unit/device of the UPS system.

In the UPS system, the individual UPS modules can be connected in parallel to one AC source, or to different AC sources. Furthermore, also the individual UPS devices can be connected to different AC sources, e.g. one AC source powering the bypass, and a different AC source connected to the AC/DC converter of the converter part.

Control principles discussed with respect to the UPS device apply also to the UPS system and vice versa.

According to a modified embodiment of the invention, each switching unit comprises semiconductor switches, which are not current-commutated. Current commutated switches like e.g. conventional thyristors have the problem, that a gap in load voltage with a length of up to half a line cycle is possible until a conducting source self-commutates, and load voltage and with inverter voltage, reverses. With not current-commutated semiconductor switches, this problem can be avoided. Such not current-commutated semiconductor switches are recently developed, which enable gate control and low voltage drop resulting in high efficiency. An example for not current-commutated semiconductor switches are e.g. Integrated Gate Controlled Thyristors (IGCT).

According to a modified embodiment of the invention, each switching unit comprises two independently controlled uni-directionally conducting and reverse blocking semiconductor switches, which form an anti-parallel pair of semiconductor switches. Hence, current flow can be fully controlled for each phase independently from present voltage conditions. In reverse blocking mode, a voltage is applied in a direction that would be blocked by a diode. Furthermore, this switch configuration enables low power losses in operation. Reverse blocking is a passive function, which does not require active control of the switching unit.

According to a modified embodiment of the invention, the semiconductor switches are provided with reverse blocking capability having inherent bi-directional voltage blocking capability or together with a reverse blocking device. The reverse blocking device can be e.g. a reverse or freewheel diode. Hence, the two different designs enable an essentially free choice of semiconductor switches.

According to a modified embodiment of the invention, the control unit is provided to control the converter part and the bypass switch to rotate the phase of the AC source, which directly supports the load via the bypass, between the bypass phases. Hence, each phase of the AC source can directly support the load at a given time. Preferably, the rotation is implemented so that each phase contributes an alternating portion of both positive and negative load voltage and/or current.

According to a modified embodiment of the invention, the control unit is provided to control the converter part and the bypass switch to rotate the phase of the AC source, which directly supports the load via the bypass, between the bypass phases with a phase angle of modulo 6. Hence, positive and negative voltage of each phase contributes to load voltage and/or current. With the total phase of 360°, each phase may support the load directly via the bypass two times for a phase of 60°. This is sometimes referred to as link modulation' and efficiency of the converter part is improved. Hence, one phase can be locked to the AC source, and the other two control load voltage and current. The lock may change phase and polarity through a line cycle, three phases*two polarities=modulo 6. The result is a gain in efficiency due to less switched events and usually a lower DC link can also be maintained leading to reduced switching losses, which are typically most relevant in silicon based devices.

According to a modified embodiment of the invention, the control unit is provided to control the converter part and the bypass switch to rotate the phase of the AC source, which directly supports the load via the bypass, between the bypass phases to adjust a phase angle of the bypass phase rotation to support a load current phase shift vs. bypass voltage. Hence, the rotation of the phase of the AC source, which directly supports the load via the bypass, can be freely implement in respect to frequency and phase. It is not even required that the rotation is periodic. The UPS device or system may fully or proportionally support load current phase shift vs. bypass voltage.

According to a modified embodiment of the invention, the control unit is provided to control the converter part and the bypass switch to inject a bypass voltage third harmonic to load voltage control reference to allow a reduced link level to maintain peak load voltage in load voltage specification. The third harmonic has a frequency three times higher than a frequency of the phases of the AC source. Hence, the third harmonic can modulate e.g. an envelope of the three phases of the AC source. Preferably, the third harmonic is in phase with the envelope of the three phases of the AC source. Hence, this results in the voltage level between the envelope and the respective peaks of the three phases of the AC source being reduced. Link voltage reduction increases system efficiency and thereby reduces losses in the UPS device or system.

According to a modified embodiment of the invention, the converter part is provided as a double conversion converter part with a AC/DC converter, which is connectable to the AC source, a DC/AC converter, which is connectable to the load, a DC link, interconnecting the DC part of the AC/DC converter and the DC/AC converter, and a DC/DC converter, which is connectable to a DC source. This design of the converter part refers to a typical double conversion UPS design. Accordingly, an AC source is first rectified by the AC/DC converter and then inverted by the DC/AC converter to support the load. Alternatively, the load can be supported from the DC source via the DC/DC converter. However, also different converter part designs are possible. In a preferred embodiment, the DC source is part of the UPS device or the UPS system. By controlling the phase-to-phase voltages According to a modified embodiment of the invention, the control unit is provided to control the converter part and the bypass switch to control phase-to-phase voltages of the DC/AC converter to support a load voltage specification. By adjusting the voltages of the two phases powering the load via the converter part, voltage deviations of the phase, which directly powers the load via the bypass switch, from a load voltage specification can be compensated without transferring the third phase also to the converter part. Since the UPS device or the UPS system are 3-wire installations, no Neutral is present for a load return current. Therefore, load current flow and voltage control are phase to phase. By adjusting the voltages of the two phases on the converter part, it is possible to correct for bypass voltage difference from a load voltage specification.

According to a modified embodiment of the invention the control unit is provided to control the converter part and the bypass switch to bi-directionally transfer energy between the DC link and the AC source via the bypass. This enables to control reactive power and current distortion to/from the AC source connected to the bypass.

According to a modified embodiment of the invention, the UPS system has multiple parallel communication buses between the UPS devices and/or between the bypass switches of the UPS devices. Hence, the bypass switches of the parallel UPS devices can be commonly controlled perform parallel switching of the phase of the AC source, which directly supports the load via the bypass.

BRIEF DESCRIPTION OF DRAWINGS

These and other aspects of the invention will be apparent from and elucidated with reference to the embodiments described hereinafter.

In the drawings.

DETAILED DESCRIPTION OF THE INVENTION

Figure 1:
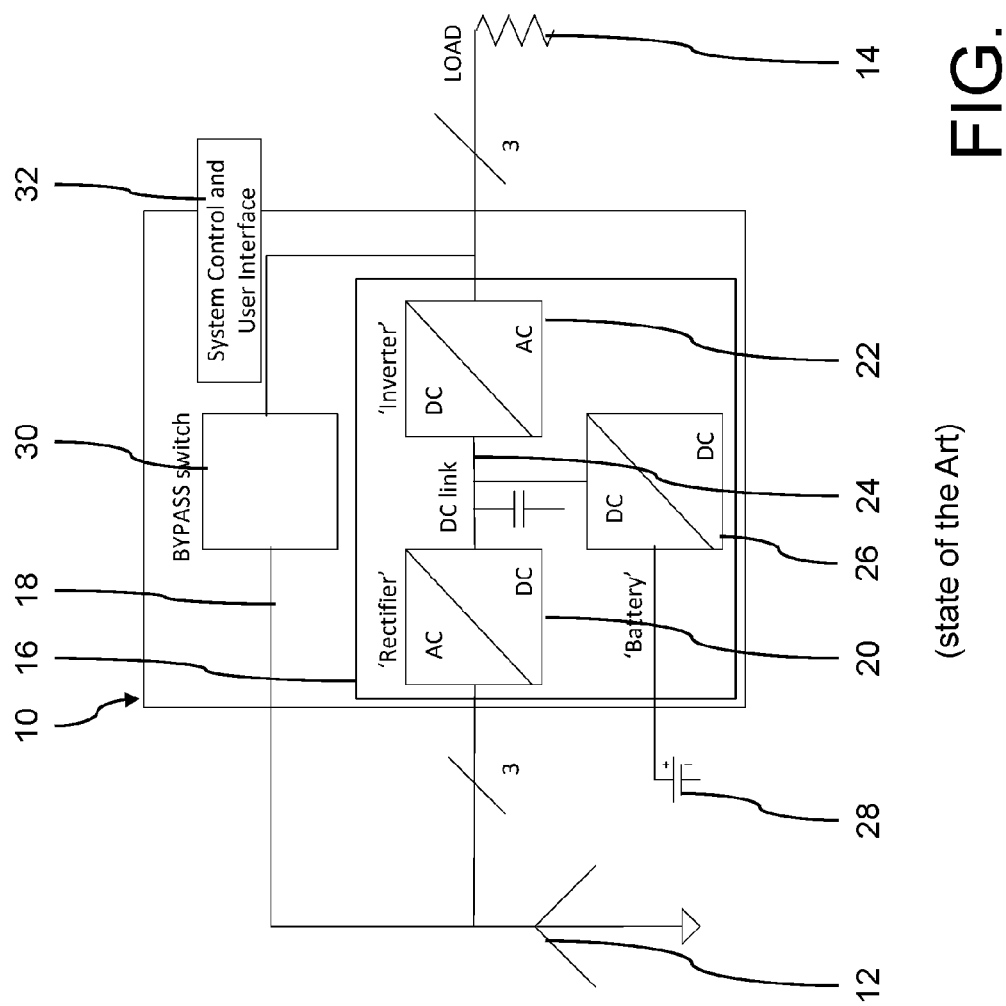
FIG. 1 shows a schematic view of a generic double conversion uninterruptible power supply (UPS) device according to a first embodiment, as known in the Art.
Figure 2:
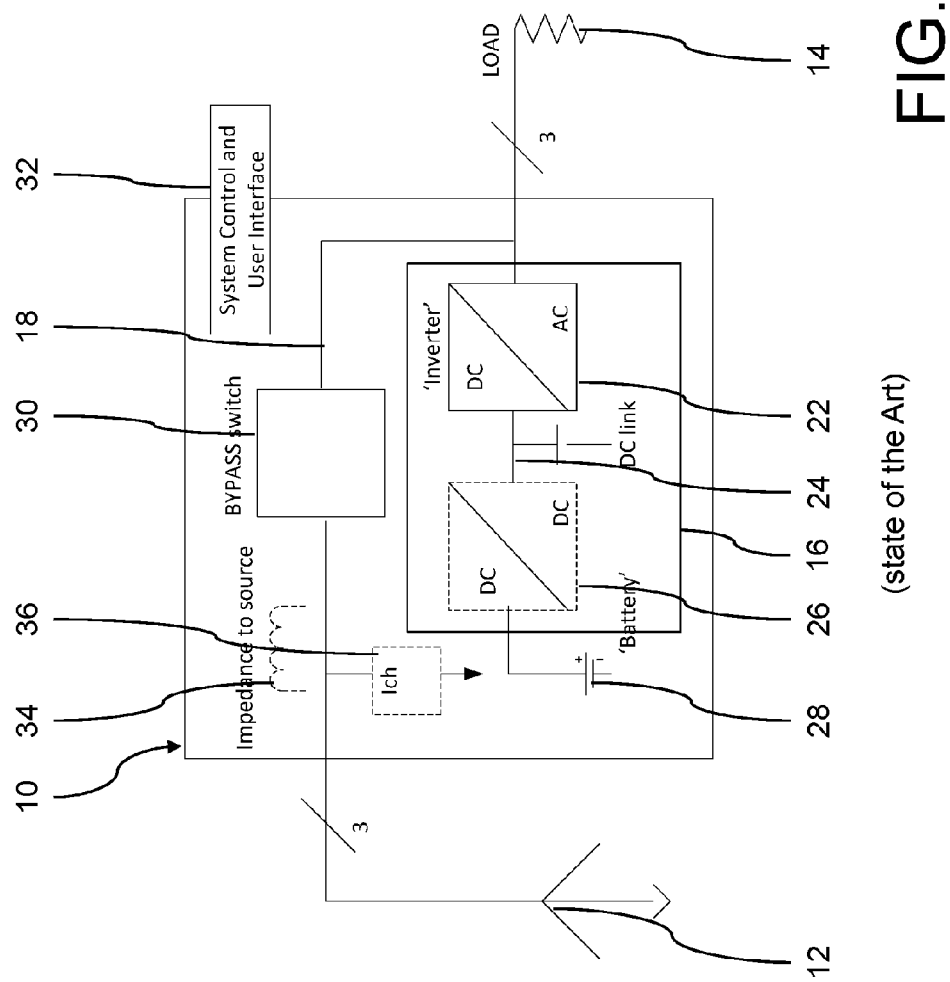
FIG. 2 shows a schematic view of a uninterruptible power supply (UPS) device according to a second embodiment, as known in the Art, in operation in case of failure of the AC source.
Figure 3:
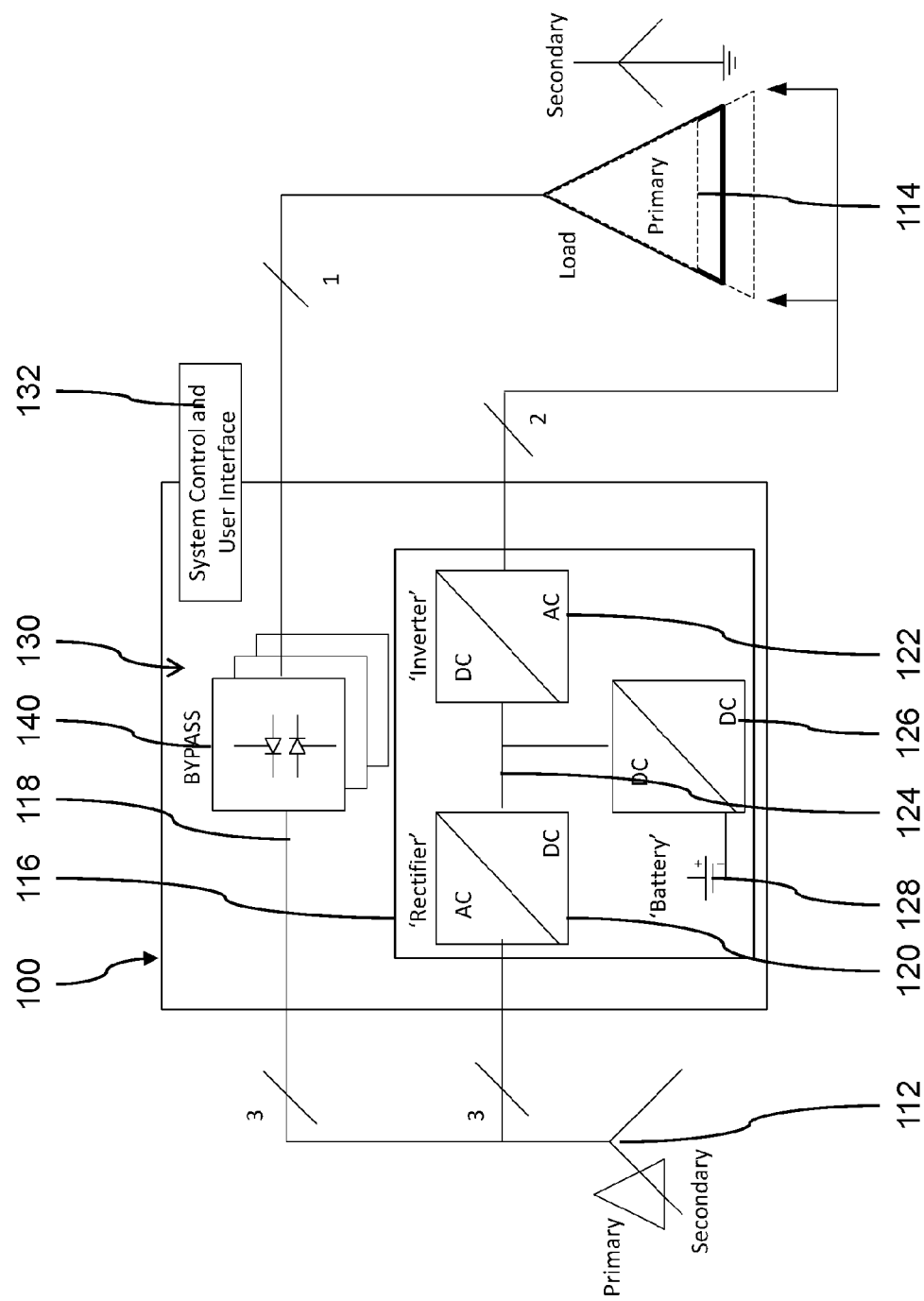
FIG. 3 shows a schematic view of a double conversion uninterruptible power supply (UPS) device according to a third embodiment in operation.

FIG. 3 shows a double conversion UPS device 100 according to a third embodiment. The UPS device 100 is connected between a 3-wire multiphase AC source 112 and a 3-wire multiphase load 114. The UPS device 100 is provided for multiphase operation.

The UPS device 100 comprises a converter part 116 and a 3-wire bypass 118, which are connected in parallel to the AC source 112 and the load 114. The converter part 116 is provided to perform double conversion and comprises an AC/DC converter 120, also referred to as rectifier, which is connected at its AC side to the AC source 112, and a DC/AC converter 122, also referred to as inverter, which is connected at its AC side to the load 114. A DC side of the AC/DC converter 120 and the DC/AC converter 122 is interconnect by a DC link 124, which isolates the AC source 112 from the load 114.

The converter part 116 further comprises a DC/DC converter 126, also referred to as battery converter, which connects a DC source 128 to the DC link 124. The DC source 128 of the third embodiment is a stored energy device, i.e. a battery. According to the third embodiment, the DC source 128 is provided integrally with the converter part 116. In an alternative embodiment, the DC source 128 is provided separate from the converter part 116, but integrally with the UPS module 100. In a further alternative embodiment, the DC source 128 is provided separate from the UPS module 100.

The UPS device 100 also comprises a control unit 132, which is provided integrally with a user interface. The control unit 132 controls operation of the converter part 116 and a bypass switch 130 in the bypass 118. In particular, the control unit 132 controls the bypass switch 130 to power one of the three phases of the load 114 directly via the bypass 118 by one phase of the AC source 112, and the control unit 132 controls the converter part 116 to power the remaining two phases of the load 114. Control principles of the control unit 132 are discussed below in more detail.

The control unit 132 is provided integrally with a user interface for configuration and maintenance purposes, e.g. a screen and a keyboard or a touchscreen. Furthermore, the control unit 132 is provided integrally with a communication interface for connection to other UPS modules 100, in particular to connect the control unit 132 to control units 132 of parallel UPS devices 100.

Figure 4:
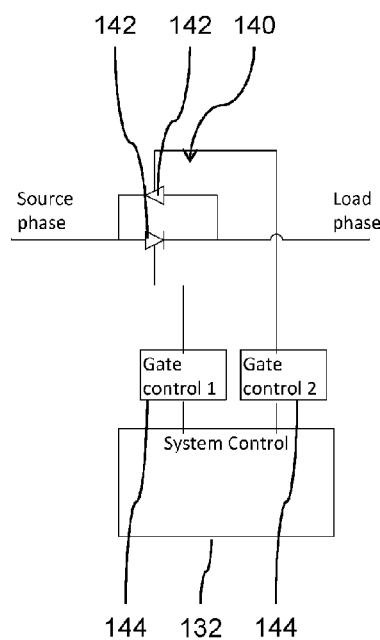
FIG. 4 shows a detailed schematic view of a switching unit of the UPS device of the third embodiment.

The bypass switch 130 comprises an independently controlled switching unit 140 for each phase. The switching unit 140, which can be seen in detail in FIG. 4, comprises according to the third embodiment, two semiconductor switches 142, which are not current-commutated. According to the third embodiment, the not current-commutated semiconductor switches 142 are Integrated Gate Controlled Thyristors (IGCT) with reverse blocking capability implemented by inherent bi-directional voltage blocking capability. As can be further seen in FIG. 4, each of the two semiconductor switches 142 is controlled from the control unit 132 via individual gate controllers 144. Hence, the semiconductor switches 142 form two independently controlled uni-directionally conducting and reverse blocking semiconductor switches of the switching unit 140, which provide an anti-parallel pair of semiconductor switches 142.

Figure 5A:
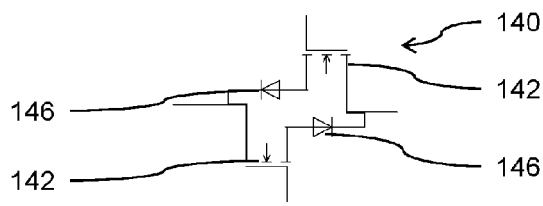
FIG. 5a shows a schematic view of a switching unit for use in the UPS device according to a fourth embodiment.

FIG. 5a shows a switching unit 140 according to a fourth embodiment. The switching unit 140 of the fourth embodiment can be used in general with the UPS device of the third embodiment.

As can be seen in FIG. 5a, the switching unit 140 of the fourth embodiment comprises an anti-parallel pair of semiconductor switches 142, which are provided together with reverse blocking devices 146.

Figure 5B:
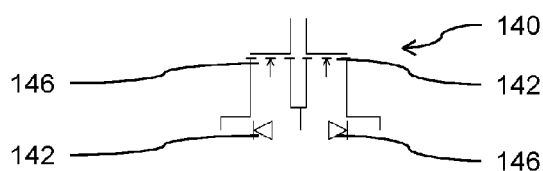
FIG. 5b shows a schematic view of a switching unit for use in the UPS device according to a fifth embodiment.

FIG. 5b shows a switching unit 140 according to a fifth embodiment. The switching unit 140 of the fifth embodiment can be used in general with the UPS device of the third embodiment.

As can be seen in FIG. 5a, also the switching unit 140 of the fourth embodiment comprises an anti-parallel pair of semiconductor switches 142, which are provided together with reverse blocking devices 146.

Subsequently will be described with reference to FIGS. 8 to 12 control of the UPS device 100 as performed by the control unit 132.

Figure 8:
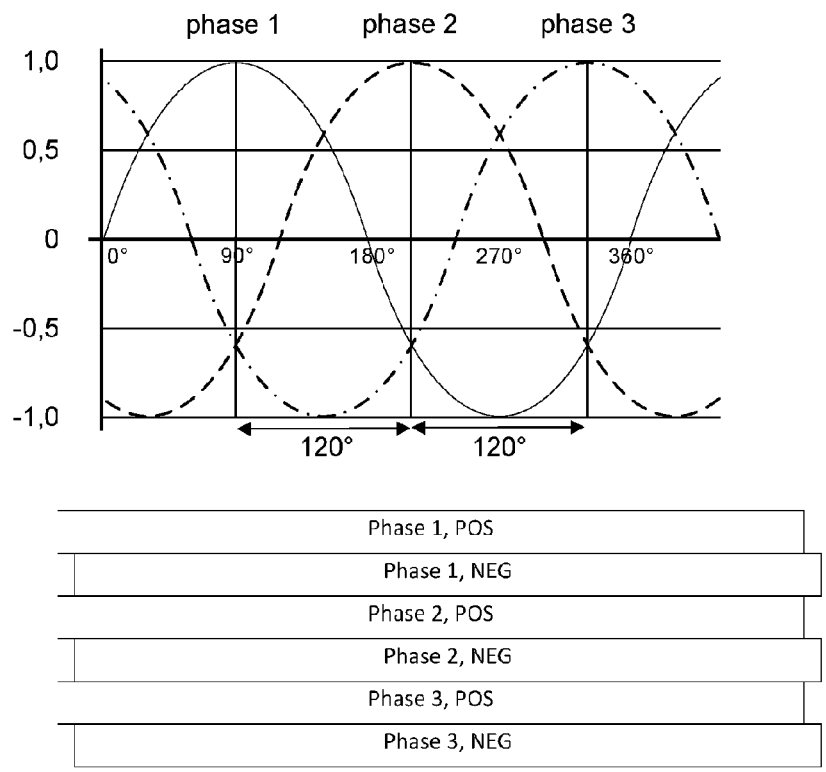
FIG. 8 shows a schematic view of three phases of the AC source and gate signals for controlling the switching units according to a first mode of operation.

FIG. 8 shows a first mode of continuous duty bypass operation. Hence, all switching units 140 are gated on. This refers e.g. to an eco-mode, where the load 114 is fully supported from the AC source 112 via bypass 118. Hence, gate signals for all switching units 140 of the bypass switch 130 are on.

Figure 9:
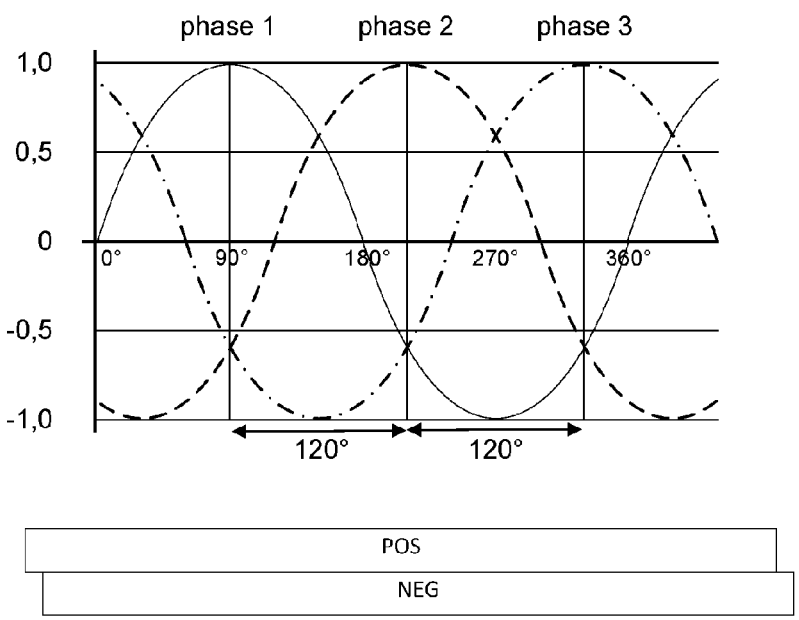
FIG. 9 shows a schematic view of a three phase voltages of the AC source according to an eighth embodiment according to a second mode of operation.

FIG. 9 shows a second mode where an arbitrary single phase of bypass 118 is continuously gated on to load 114. The other two phases of the load 114 are supported by the converter part 116, in particular by the DC/AC converter 122. The DC/AC converter 122 regulates load voltage if there is mismatch between bypass 118 and load specification. Hence, gate signal for the switching unit 140 of the arbitrary phase is on.

Figure 10:
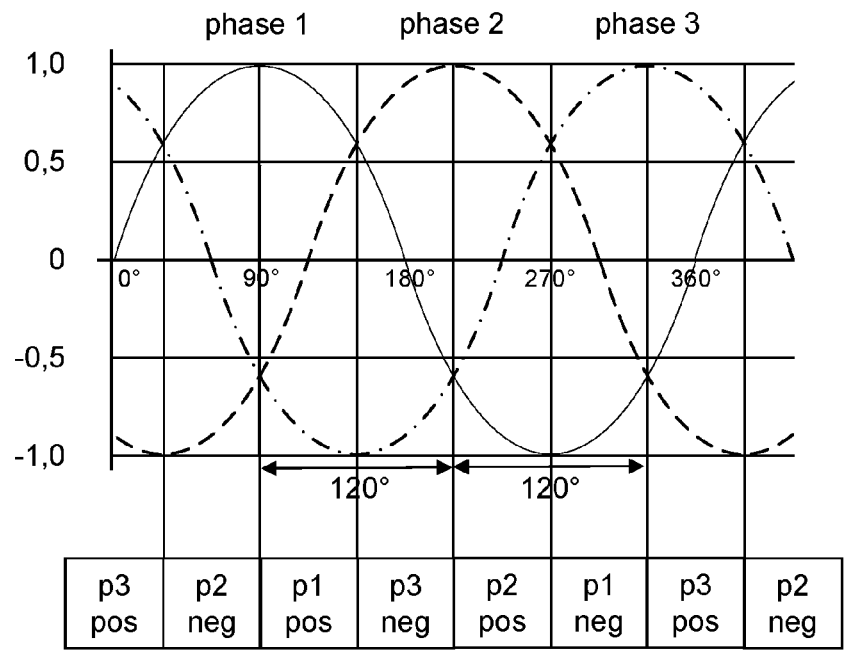
FIG. 10 shows a schematic view of a three phase voltages of the AC source according to an eighth embodiment according to a third mode of operation.

FIG. 10 refers to a third mode of operation with a gate pattern for modulation of bypass source. Hence, the control unit 132 controls the converter part 116 and the bypass switch 130 to rotate the phase of the AC source 112, which directly supports the load 114 via the bypass 118, between the bypass phases with a phase angle of modulo 6. Hence, positive and negative voltage of each phase contributes to load voltage and/or current, as can be seen in FIG. 10, whereby 'pos' and 'neg' indicate half cycle voltages. It is to be noted that a balanced and resistive three phase current will for practical purposes follow the phase voltages as depicted. Bypass gate timing may however be dynamically shifted/adjusted based on load current envelope, e.g. a heavily lagging current has smaller overall losses using the third mode of operation.

Figure 11:
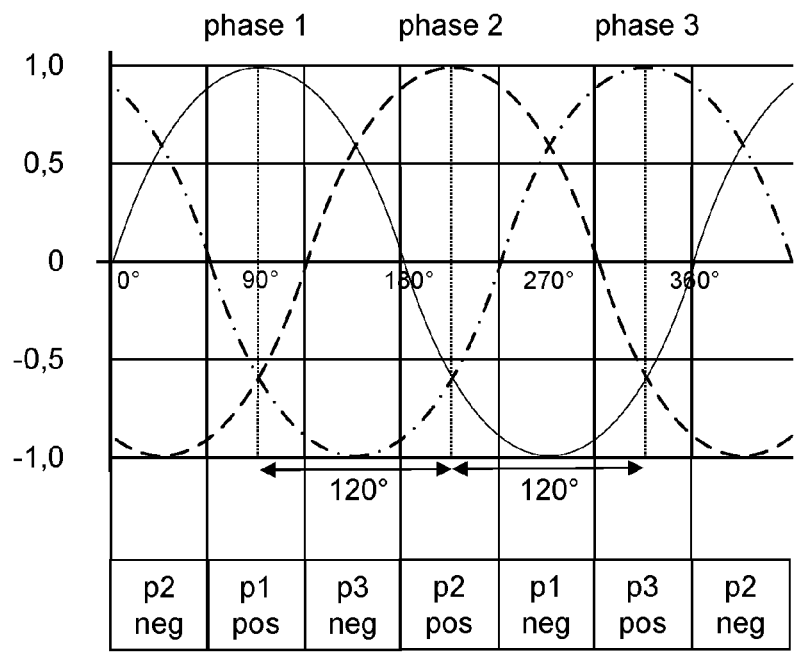
FIG. 11 shows a schematic view of a three phase voltages of the AC source according to an eighth embodiment according to a fourth mode of operation.

FIG. 11 refers to a fourth mode of operation with a gate pattern for modulation of bypass source. Hence, the control unit 132 controls the converter part 116 and the bypass switch 130 to rotate the phase of the AC source 112, which directly supports the load 114 via the bypass 118, between the bypass phases with a phase angle of modulo 6. Hence, positive and negative voltage of each phase contributes to load voltage and/or current, as can be seen in FIG. 10, whereby 'pos' and 'neg' indicate half cycle voltages. The gate pattern of the fourth mode of operation is shifted by 30° compared to the third mode of operation. Under the condition the lower gate pattern will have maximum load current on a bypass phase, the converter part 116 supports the shoulders and also regulates load voltage if there is a mismatch between bypass and nominal load voltage.

In a modified mode of operation, which is not shown in the figures, the control unit 132 controls the converter part 116 and the bypass switch 130 to rotate the phase of the AC source 112, which directly supports the load 114 via the bypass 118, between the bypass phases to adjust a phase angle of the bypass phase rotation to support a load current phase shift vs. bypass voltage.

Figure 12:
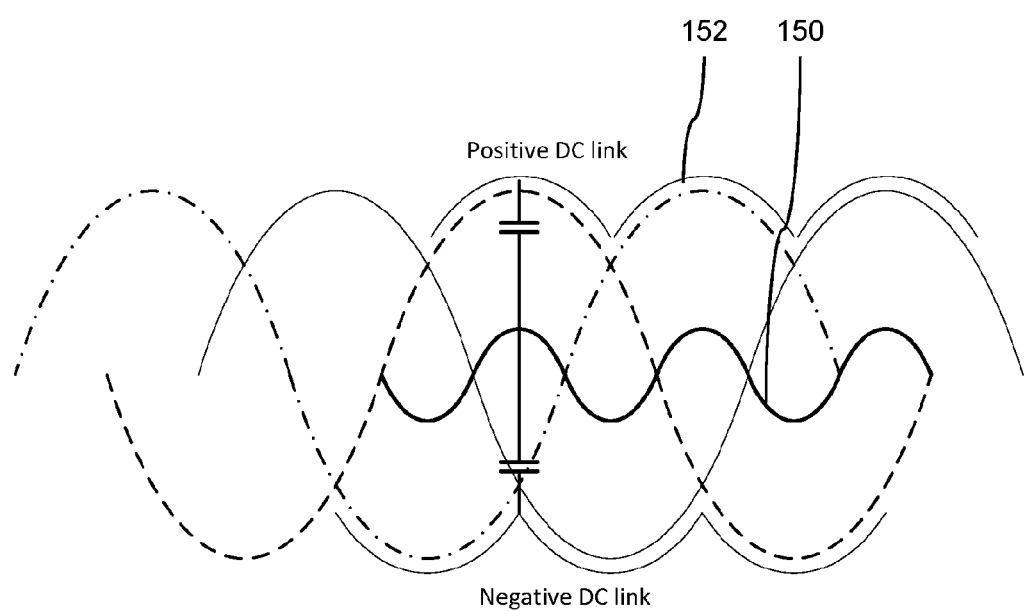
FIG. 12 shows a schematic view of three phases of the AC source and gate signals for controlling the switching units according to a fifth mode of operation.

FIG. 12 refers to a fifth mode of operation. The fifth mode of operation is based on the fourth mode of operation. Additionally, the control unit 132 controls the converter part 116 and the bypass switch 130 to inject a bypass voltage third harmonic 150 to load voltage control reference. This allows a reduced link level of the DC link, as can be seen in FIG. 12, to maintain peak load voltage in load voltage specification. The third harmonic 150 has a frequency three times higher than a frequency of the phases of the AC source 112, so that an envelope of the three phases of the AC source 112 can be modulated. The third harmonic 150 is in phase with the envelope 152.

In the above operation modes, the control unit 132 controls the converter part 116 and the bypass switch 130 to control phase-to-phase voltages of the DC/AC converter 122 to support a load voltage specification. As can be seen e.g. with respect to FIG. 3, the control unit controls the DC/AC converter 122 to maintain specified voltage levels in case of voltage variations of the phase of the AC source 112 connect via the bypass 118 to the load 114. Hence, in case of voltage variations, the control unit 132 controls the converter part 116, in particular the DC/AC converter 122 by adjusting the two phases powering the load via the converter part 116 to compensate the voltage variation without transferring the third phase also to the converter part 116.

Figure 6:
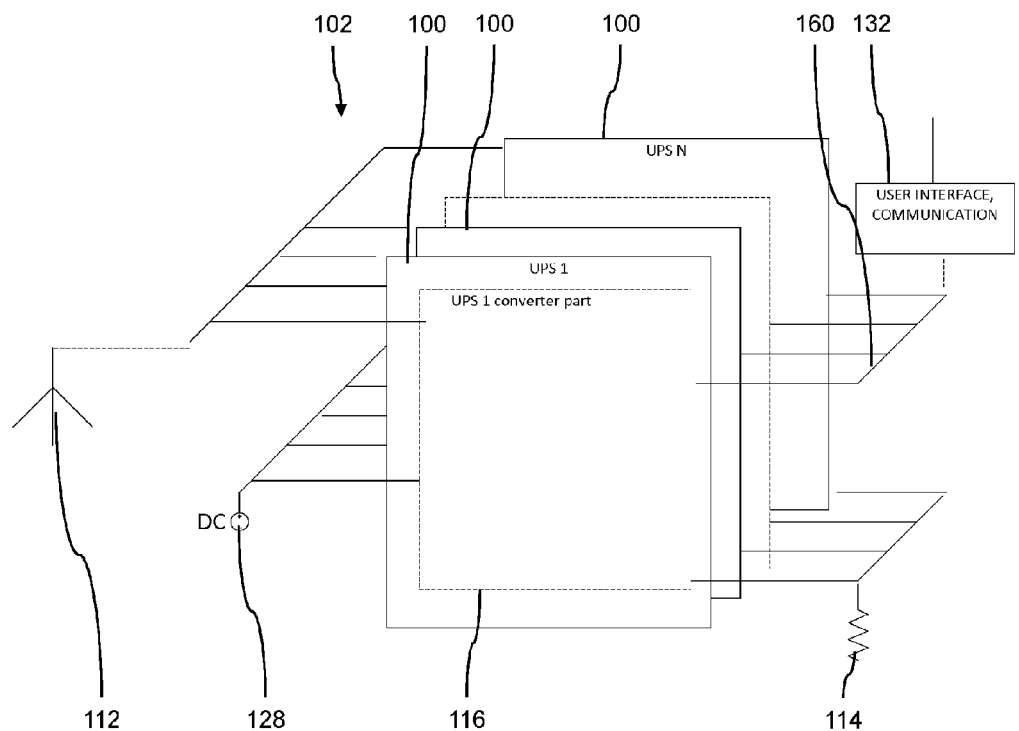
FIG. 6 shows a schematic view of a uninterruptible power supply (UPS) system according to a sixth embodiment comprising multiple parallel UPS devices.

FIG. 6 shows a UPS system 102 according to a sixth embodiment. The UPS system 102 comprises multiple UPS devices 100 of any of the previous embodiments. The UPS devices 100 are connected in parallel between the AC source 112 and the load 114. The UPS system 102 comprises a communication bus 160, which connects the control units 132 of the individual UPS devices to an overall control unit 132, which performs a common control of the UPS system 102.

Figure 7:
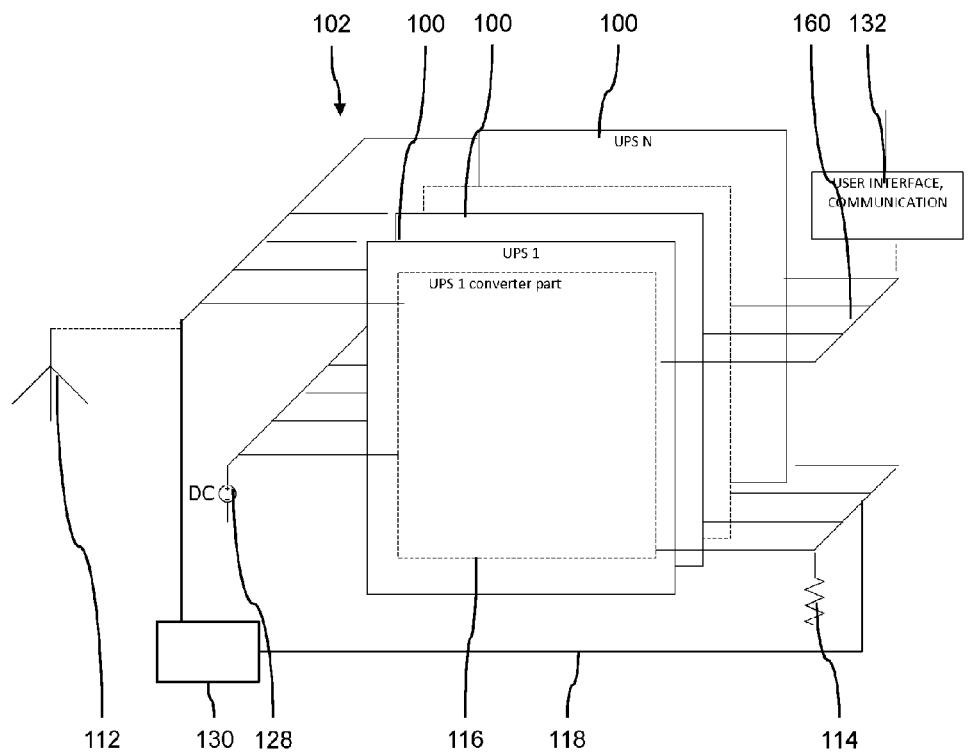
FIG. 7 shows a schematic view of a uninterruptible power supply (UPS) system according to a seventh embodiment comprising multiple parallel UPS devices and a central bypass.

FIG. 7 shows a UPS system 102 according to a seventh embodiment. The UPS system 102 comprises multiple UPS devices 100 of any of the previous embodiments. Alternatively, the UPS devices are provided without bypass 118. The UPS devices 100 are connected in parallel between the AC source 112 and the load 114. The UPS system 102 comprises a communication bus 160, which connects the control units 132 of the individual UPS devices to an overall control unit 132, which performs a common control of the UPS system 102.

The UPS system 102 according to a seventh embodiment further comprises a central bypass 118 with a bypass switch 130. Details of the central bypass 118 end the respective bypass switch 130 are as discussed above in respect to the bypass 118 of the UPS device.

The present invention further provides an uninterruptible power supply (UPS) system for connection of a 3-wire multiphase AC source to a 3-wire multiphase load, whereby the UPS system is provided for multiphase operation, the UPS system comprising multiple converter parts, which are connected in parallel to at least one power source and the load, and a 3-wire bypass, which interconnects the AC source to the load, whereby the bypass comprises a bypass switch, which comprises an independently controlled switching unit for each phase of the AC source, and the UPS system comprises a control unit, which controls the multiple converter parts and the bypass switch, whereby the control unit controls the bypass switch to power one of the three phases of the load directly via the bypass by one phase of the AC source, and the control unit controls the multiple converter part to power the remaining two phases of the load.

While the invention has been illustrated and described in detail in the drawings and foregoing description, such illustration and description are to be considered illustrative or exemplary and not restrictive; the invention is not limited to the disclosed embodiments. Other variations to be disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

REFERENCE SIGNS LIST

10 UPS device (state of the Art)
12 AC source (state of the Art)
14 load (state of the Art)
16 converter part (state of the Art)
18 bypass (state of the Art)
20 AC/DC converter (state of the Art)
22 DC/CA converter (state of the Art)
24 DC link (state of the Art)
26 DC/DC converter (state of the Art)
28 DC source (state of the Art)
30 bypass switch (state of the Art)
32 control unit (state of the Art)
34 series impedance, inductor (state of the Art)
36 charger (state of the Art)
100 UPS device
102 UPS system
112 AC source
114 load
116 converter part
118 bypass
120 AC/DC converter
122 DC/CA converter
124 DC link
126 DC/DC converter
128 DC source
130 bypass switch
132 control unit
140 switching unit
142 semiconductor switch
144 gate controller
146 reverse blocking device
150 third harmonic
152 envelope
160 communication bus

The invention claimed is:

1. An uninterruptible power supply (UPS) device for connection of a 3-wire multiphase AC power source to a 3-wire multiphase load, the UPS device is provided for multiphase operation, comprising:
a converter part, which is connected to at least one power source and the 3-wire multiphase load, and
a 3-wire bypass, which interconnects the 3-wire multiphase AC power source to the 3-wire multiphase load, whereby
the 3-wire bypass comprises a bypass switch, which comprises an independently controlled switching unit for each phase of the 3-wire multiphase AC power source, and
a control unit, which controls the converter part and the bypass switch, whereby the control unit controls the bypass switch to power one of three phases of the 3-wire multiphase load directly via the 3-wire bypass by one phase of the 3-wire multiphase AC power source, and the control unit controls the converter part to power the remaining two phases of the 3-wire multiphase load,
wherein the control unit is operable to control the converter part and the bypass switch to rotate a phase of the 3-wire multiphase AC power source, which directly supports the 3-wire multiphase load via the 3-wire bypass, between bypass phases, so that half cycle positive and negative voltages of each phase contribute in an alternating way to load voltage and/or current.

2. The uninterruptible power supply (UPS) device according to claim 1, wherein
each switching unit comprises semiconductor switches, which are not current-commutated.

3. The uninterruptible power supply (UPS) device according to claim 2, wherein
the control unit is operable to control the converter part and the bypass switch to rotate the phase of the AC source, which directly supports the 3-wire multiphase load via the 3-wire bypass, between the bypass phases.

4. The uninterruptible power supply (UPS) device according to claim 1, wherein
each switching unit comprises two independently controlled uni-directionally conducting and reverse blocking semiconductor switches, which form an anti-parallel pair of semiconductor switches.

5. The uninterruptible power supply (UPS) device according to claim 4, wherein
the semiconductor switches includes reverse blocking capability having inherent bi-directional voltage blocking capability or together with a reverse blocking device.

6. The uninterruptible power supply (UPS) device according to claim 1, wherein
the control unit is operable to control the converter part and the bypass switch to rotate the phase of the 3-wire multiphase AC power source, which directly supports the 3-wire multiphase load via the 3-wire bypass, between the bypass phases with a phase angle of modulo 6.

7. The uninterruptible power supply (UPS) device according to claim 6, wherein
the control unit is operable to control the converter part and the bypass switch to rotate the phase of the 3-wire multiphase AC power source, which directly supports the load via the 3-wire bypass, between the bypass phases to adjust a phase angle of the bypass phase rotating to support a load current phase shift vs. bypass voltage.

8. The uninterruptible power supply (UPS) device according to claim 1, wherein
the control unit is operable to control the converter part and the bypass switch to rotate the phase of the 3-wire multiphase AC power source, which directly supports the 3-wire multiphase load via the 3-wire bypass, between the bypass phases to adjust a phase angle of the bypass phase rotating to support a load current phase shift vs. bypass voltage.

9. The uninterruptible power supply (UPS) device according to claim 1, wherein
the control unit is operable to control the converter part and the bypass switch to inject a bypass voltage third harmonic to load voltage control reference to allow a reduced link level to maintain peak load voltage in load voltage specification.

10. The uninterruptible power supply (UPS) device according to claim 1, wherein the control unit is operable to control the converter part and the bypass switch to control phase-to-phase voltages of a DC/AC converter to support a load voltage specification.

11. The uninterruptible power supply (UPS) device according to claim 10, wherein
the converter part comprises the DC/AC converter.

12. The uninterruptible power supply (UPS) device according to claim 11, wherein
the control unit is operable to control the converter part and the bypass switch to bi-directionally transfer energy between the DC link and the 3-wire multiphase AC power source via the 3-wire bypass.

13. The uninterruptible power supply (UPS) device according to claim 10, wherein
the control unit is operable to control the converter part and the bypass switch to bi-directionally transfer energy between the DC link and the 3-wire multiphase AC power source via the 3-wire bypass.

14. An uninterruptible power supply (UPS) system comprising multiple UPS devices according to claim 1, wherein the UPS devices are connected in parallel to the 3-wire multiphase load.

15. The uninterruptible power supply (UPS) system according to claim 14, wherein
the UPS system has multiple parallel communication buses between the UPS devices and/or between the bypass switches of the UPS devices.

16. The uninterruptible power supply (UPS) device according to claim 1, wherein
each switching unit comprises two independently controlled uni-directionally conducting and reverse blocking semiconductor switches, which form an anti-parallel pair of semiconductor switches.

17. The uninterruptible power supply (UPS) device according to claim 16, wherein
the semiconductor switches includes reverse blocking capability having inherent bi-directional voltage blocking capability or together with a reverse blocking device.

18. The UPS device according to claim 1, wherein the control unit is further configured to adjust a phase angle of the bypass phase rotating to support a load current phase shift.

19. An uninterruptible power supply (UPS) system for connection of a 3-wire multiphase AC power source to a 3-wire multiphase load, whereby the UPS system is provided for multiphase operation, the UPS system comprising:
multiple converter parts, which are connected in parallel to at least one power source and the 3-wire multiphase load, and
a 3-wire bypass, which interconnects the 3-wire multiphase AC power source to the 3-wire multiphase load, whereby
the 3-wire bypass comprises a bypass switch, which comprises an independently controlled switching unit for each phase of the 3-wire multiphase AC power source, and
control unit, which controls the multiple converter parts and the bypass switch, whereby the control unit controls the bypass switch to power one of three phases of the 3-wire multiphase load directly via the 3-wire bypass by one phase of the 3-wire multiphase AC power source, and the control unit controls the multiple converter parts to power the remaining two phases of the 3-wire multiphase load,
wherein the control unit is further operable to control the multiple converter parts and the bypass switch to rotate a phase of the 3-wire multiphase AC power source, which directly supports the 3-wire multiphase load via the bypass, between the bypass phases, so that half cycle positive and negative voltages of each phase contribute in an alternating way to load voltage and/or current.

20. A method for controlling an uninterruptible power supply (UPS) device, which connects a 3-wire multiphase AC power source to a 3-wire multiphase load, whereby the UPS device is provided for multiphase operation, comprising:
a converter part, which is connected to at least one power source and the 3-wire multiphase load, and
a 3-wire bypass, which interconnects the 3-wire multiphase AC power source to the 3-wire multiphase load, whereby
the 3-wire bypass comprises a bypass switch, which comprises an independently controlled switching unit for each phase of the 3-wire multiphase AC power source, and
the method comprises controlling the converter part and the bypass switch, whereby the bypass switch is controlled to power one of the three phases of the 3-wire multiphase load directly via the 3-wire bypass by one phase of the 3-wire multiphase AC power source, and the converter part is controlled to power the remaining two phases of the 3-wire multiphase load,
wherein controlling comprises to control the converter part and the bypass switch to rotate a phase of the 3-wire multiphase AC power source, which directly supports the 3-wire multiphase load via the 3-wire bypass, between bypass phases, so that half cycle positive and negative voltages of each phase contribute in an alternating way to load voltage and/or current.

* * * * *